United States Patent [19]

Toshioka et al.

[11] 4,059,822
[45] Nov. 22, 1977

[54] FAULT DETECTING SYSTEM FOR VEHICLE OCCUPANTS PROTECTIVE APPARATUS

[75] Inventors: Toru Toshioka, Toyota; Kazuo Oishi, Oobu; Takashi Yamada, Anjo, all of Japan

[73] Assignees: Toyota Jidosha Kogyo Kabushiki Kaisha, Toyota; Nippon Soken, Inc., Nishio, both of Japan

[21] Appl. No.: 603,503

[22] Filed: Aug. 11, 1975

Related U.S. Application Data

[63] Continuation-in-part of Ser. No. 348,533, April 6, 1973, abandoned.

[30] Foreign Application Priority Data

Apr. 10, 1972   Japan .................................. 47-35933

[51] Int. Cl.² .................... B60R 21/02; G08B 29/00
[52] U.S. Cl. ........................... 340/52 H; 180/103 A; 280/735
[58] Field of Search .................. 340/52 R, 52 H, 61, 340/262; 280/735; 180/92, 103 A

[56] References Cited

U.S. PATENT DOCUMENTS

| | | | |
|---|---|---|---|
| 3,622,974 | 11/1971 | Best et al. | 340/53 |
| 3,629,816 | 12/1971 | Gillund | 340/61 |
| 3,703,702 | 11/1972 | Arai | 340/52 R |
| 3,711,827 | 1/1973 | Houseman | 340/52 B |
| 3,735,398 | 5/1973 | Ross | 343/7 ED |
| 3,848,695 | 11/1974 | Lacaze, Jr. | 180/103 |
| 3,889,232 | 6/1975 | Bell | 340/52 H |
| 3,911,391 | 10/1975 | Held et al. | 340/52 H |
| 3,921,129 | 11/1975 | Sumide | 340/52 H |
| 3,931,527 | 1/1976 | Oishi et al. | 307/10 R |

Primary Examiner—John W. Caldwell, Sr.
Assistant Examiner—Joseph E. Nowicki
Attorney, Agent, or Firm—Cushman, Darby & Cushman

[57] ABSTRACT

A fault detecting system adapted for detecting whether a occupants protective apparatus, e.g., an air bag apparatus, seat belt apparatus or rear-end collision preventing apparatus installed in a vehicle, particularly an automobile, is in a normal condition. The system comprises means for detecting the occurrence of a fault or faults in an occupants protective apparatus, means for storing the fact that the occurrence of a fault has been detected by the detecting means, and means for preventing the operation of occupants protective apparatus actuating means as long as the storage means retains its stored content, whereby misoperation of the occupants protective apparatus due to any faulty condition is prevented.

9 Claims, 2 Drawing Figures

FAULT DETECTING SYSTEM FOR VEHICLE OCCUPANTS PROTECTIVE APPARATUS

CROSS REFERENCE TO THE RELATED APPLICATION

This is a continuation-in-part of U.S. Ser. No. 348,533 filed on Apr. 6, 1973, abandoned.

BACKGROUND OF THE INVENTION

1. Field of the Invention

The present invention relates to a fault detecting system for detecting whether an occupants protective apparatus, e.g., an air bag apparatus, seat belt apparatus or rear-end collision preventing apparatus installed in a vehicle, particularly an automobile is functioning normally.

2. Description of the Prior Art

Occupants protective apparatus, e.g., an air bag apparatus, are known which come into operation to protect the occupants of a vehicle when the vehicle is in imminent danger. A drawback of these prior art devices is that if the occupants protective apparatus is already in a faulty condition when its operation is required, it will be entirely useless, whereas, even if the apparatus once became faulty before and has been temporarily returned to a normal condition, it is no longer reliable in operation and therefore there is a dangerous situation, if the occupants of the vehicle believe that the apparatus is in the normal condition.

SUMMARY OF THE INVENTION

It is the general object of the present invention to solve these difficulties.

It is a specific object of the present invention to provide a fault detecting system for use with vehicle occupants protective apparatus, wherein when a fault occurs in an occupants protective apparatus, this fact is permanently stored in storage means until the fault is mended and the apparatus is thus returned to the normal condition, while the operation of occupants protective apparatus actuating means is prevented so long as the storage means retains its stored content. It is thus possible to detect whether the occupants protective apparatus has been functioning normally or has been in a faulty condition when the occupants protective apparatus is brought into operation or prior to a time when the operation of the apparatus is called for, and it is also possible to prevent the misoperation of the apparatus due to any fault in the apparatus.

It is another specific object of this invention to provide a fault detecting system, wherein the pseudo signal for operating the occupants protective apparatus actuating means is applied to an operation circuit of the apparatus which is adapted to determine the operation of the apparatus actuating means, whereby whether or not the operation circuit is in the normal condition is detected by the pseudo signal, thereby attaining the same effect as the first-mentioned object.

It is still another specific object of the present invention to provide a fault detecting system which is capable of detecting whether the occupants protective apparatus actuating means is in the normal condition, thereby attaining the same effect as the first-mentioned object.

It is still another specific object of the present invention to provide a fault detecting system wherein an alarm is sounded while the storage means retains its stored content, thereby warning and calling the driver's attention to the presence of a fault.

It is still another specific object of the present invention to provide a fault detecting system wherein the output of check means is stored in the storage means only when this output lasts in excess of a predetermined time, whereby in the normal condition of the occupants protective apparatus, the apparatus is prevented from being actuated by external noise.

It is still another specific object of the present invention to provide a fault detecting system in which the storage means includes a fuse. Such a system is therefore simple in construction, inexpensive and reliable in storage action.

Thus, according to the first object of this invention, since the occurrence of a fault in the occupants protective apparatus is permanently stored in the storage means until the fault is mended and the apparatus is returned to the normal condition and the operation of the occupants protective apparatus actuating means is prevented from being initiated so long as the storage means retains its stored content, there is a great advantage in that whether the occupants protective apparatus has been in the normal condition or in a faulty condition may be detected prior to a time at which the apparatus comes into operation or the apparatus must be operated, and moreover the misoperation of the apparatus due to such a fault may be prevented.

According to the second object of the invention, since the pseudo signal for operating the occupants protective apparatus actuating means is applied to the operation circuit of the apparatus which is adapted to determine the operation of the apparatus actuating means, there is a great advantage in that whether or not the operation circuit is in the normal condition can be detected by virtue of the pseudo signal.

According to the third object of this invention, there is a great advantage in that whether the occupants protective apparatus actuating means is in the normal condition can be detected and hence it is possible to prevent the occurrence of an accident due to the faulty condition of the apparatus actuating means despite the operation circuit being in the normal condition.

According to the fourth object of this invention, there is a great advantage in that an alarm is sounded so long as the storage means retains its stored content, whereby the driver may be warned and his attention called to the existence of a fault, thereby preventing the occurrence of an accident due to the driver's ignorance of the presence of a fault.

According to the fifth object of this invention, since the output of the check means is stored in the storage means only when the output lasts in excess of a predetermined time, there is a great advantage in that it is possible to prevent external noise from causing the fault detecting system to misjudge that there has been the occurrence of a fault in the apparatus and thus come into operation erroneously. This has the effect of improving the reliability of the system.

According to the sixth object of this invention wherein the storage means consists of a fuse, the is a great advantage in that the information stored by the melting of the fuse upon the collision of a vehicle can be preserved and positively stored and that the system is thus simplified and made inexpensive.

DETAILED DESCRIPTION OF THE PREFERRED EMBODIMENT

The present invention will now be explained with reference to the illustrated embodiment.

Figure 1:
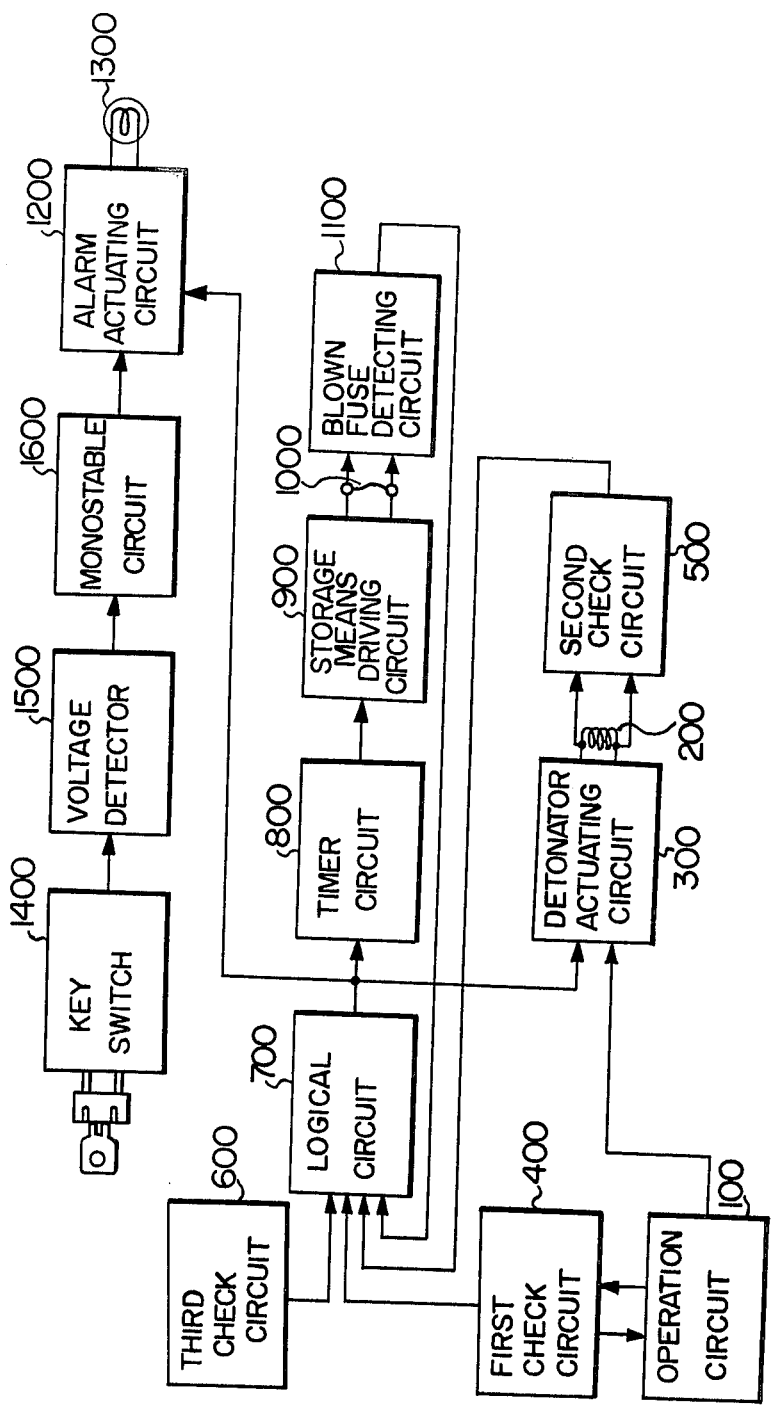
FIG. 1 is a block diagram showing an embodiment of a fault detecting system according to the present invention.

Referring first to FIG. 1 of the drawings, the general construction and operation of the system according to the present invention will be described. In FIG. 1, the illustrated occupants protective apparatus is of the type which causes an air bag to inflate near the breast of the occupants of an automobile when a collision is likely to occur or immediately after the occurrence of a collision. Numeral 100 designates an operation circuit for radiating microwave energy against targets, e.g., automobiles and human beings in front of the automobile equipped with the occupants protective apparatus to detect whether there is the danger of a collision between the automobile and the targets. Numeral 200 designates a filament of a detonator constituting a part of actuating means for inflating an air bag with a compressed air pressure, whereby the filament ignites and sets off the explosive to open a valve and thereby introduce compressed air into an air bag (not shown) from a compressed air bomb (not shown). Numeral 300 designates a detonator actuating circuit, whereby when a signal directing inflation of the air bag is received from the operation circuit 100 and when there is no fault at any portion of the apparatus, a current is supplied to the filament 200 so that the explosive is ignited by the heated filament 200, whereas when there is a fault at least at one portion of the apparatus, a current is not supplied to the filament 200 thereby preventing the operation of the apparatus actuating means from being initiated. Numeral 400 designates a first check circuit for supplying the pseudo signal to the operation circuit 100 to find whether the operation circuit 100 is functioning normally. Numeral 500 designates a second check circuit for finding whether the filament 200 is in a normal condition or burnt out. Numeral 600 designates a third check circuit for finding whether the pressure in the compressed air bomb is higher than a value sufficient to inflate the air bag. Numeral 700 designates a logical circuit for receiving the output signals from the first, second and third check circuits 400, 500 and 600 which indicate the presence of faults in the apparatus and supplying an output to a timer circuit 800 in the succeeding stage, whereby the timer circuit 800 actuates a storage means driving circuit 900 only when the fault indicating signal received from the logical circuit 700 lasts in excess of a predetermined time.

Numeral 1000 designates a fuse constituting a storage which is melted by the storage means driving circuit to store or remember the occurrence of a fault. Numeral 1100 designates a blown fuse detecting circuit which supplies its output signal to the logical circuit 700 along with the other three inputs when the fuse 1000 is melted. Numeral 1200 designates an alarm actuating circuit for receiving the fault indicating signal from the logical circuit 700 to cause a lamp 1300 to go on and off intermittently. The lamp 1300 is installed in the driver's compartment at a place readily noticeable by the driver. Numeral 1400 designates a key switch for operating the engine of the vehicle, 1500 a voltage detecting circuit for actuating a monostable circuit 1600 in the succeeding stage upon closing of the key switch 1400. When the key switch 1400 is closed, a lamp 1300 is turned on for a length of time which is dependent on the output of the monostable circuit 1600.

Figure 2:
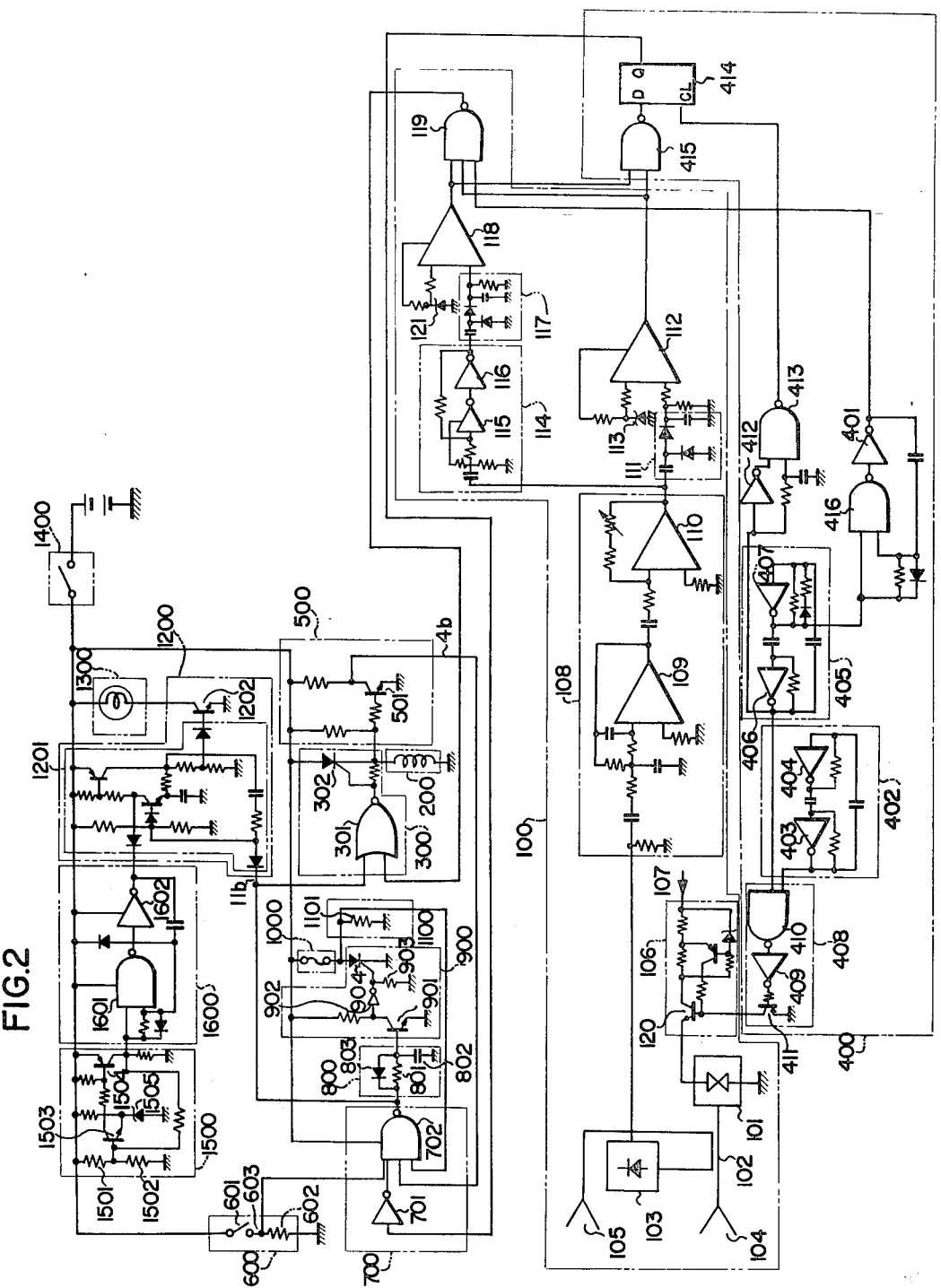
FIG. 2 is a detailed electrical circuit diagram of the embodiment shown in FIG. 1.

A detailed circuit construction of each of the component parts shown in the form of blocks in FIG. 1 will be explained with reference to FIG. 2. In FIG. 2, the operation circuit 100 is constructed as follows: Numeral 101 designates a microwave oscillator which may consist of an IMPATT diode, for example. Numeral 102 designates a directional coupler, 103 a microwave detecting diode, 104 and 105 transmitting antenna and receiving antenna mounted on the front part of the automobile, whereby the transmitting antenna 104 radiates microwaves against the target objects located in front of the automobile and the receiving antenna 105 receives the reflected waves from the target objects. Numeral 106 designates a current regulator circuit for regulating power supplied to a power supply terminal 107 into a constant current which is supplied and converted into a microwave power in the microwave oscillator 101. Numeral 108 designates a low frequency amplifier consisting of operational amplifiers 109 and 110 and having a band-pass characteristic between 300 Hz and 3 KHz to amplify the doppler signal supplied from the microwave detecting diode 103 to a level on the order of several volts. This doppler signal has a frequency corresponding to the relative velocity of the automobile and the target object and a level which is a measure of the size, material or distance of the target. Numeral 111 designates a rectifier circuit for rectifying the doppler signal amplified by the amplifier 108 and producing a DC voltage corresponding to the level of the doppler signal. Numeral 112 designates an operational amplifier which compares the output voltage of the rectifier circuit 111 with a fixed value dependent upon the Zener voltage of a Zener diode 113 so that when the former is greater than the latter, that is, when there is a first condition indicating the danger of the automobile colliding with the target, the operational amplifier 112 produces a "1" signal. Numeral 114 designates a Schmitt circuit consisting of inverters 115 and 116 for reshaping the doppler signal from the low frequency amplifier 108 into a rectangular waveform which is applied to a D-A converter 117 where it is converted into a DC voltage proportional to the frequency of the applied rectangular waveform. Numeral 118 designates an operational amplifier which compares the output voltage of the D-A converter 117 with a fixed value dependent upon the Zener voltage of a Zener diode 121, so that when the former is greater than the latter, that is, where there is a second condition indicating that the relative velocity of the automobile and the target is such that there is the danger of the automobile colliding with the target, the operational amplifier 118 produces a "1" signal. The operational amplifiers 109, 110, 112 and 118 respectively consist of for example a monolithic IC device μA 741 manufactured by Fairchild Incorporation of the United States of America. Numeral 119 designates a NAND gate which produces a "0" signal for inflating the air bag only when all of the outputs of the operational amplifiers 112 and 118 and an inverter 401 in the first check circuit 400 that will be described later are "1" signals.

The detonator actuating circuit 300 is composed of an NOR gate 301 and a silicon controlled rectifier element 302 (hereinafter referred to as an SCR) which is connected in series with the filament 200. The output of the above-mentioned NAND gate 119 in the operation circuit 100 is applied as one input to the NOR gate 301 and the output of the logical circuit 700 is applied as the other input thereto, so that when both of the inputs are "0", that is, when, with no fault occurring in any portions of the apparatus, the operation circuit 100 decides that the air bag should be inflated, the SCR 302 is turned on to energize and heat the filament 200.

The first check circuit 400 includes pseudo signal generating means, and numeral 402 designates an astable multivibrator constituting the pseudo signal generating means and composed of inverters 403 and 404 to generate pseudo signals at a frequency of about 3 KHz. Numeral 405 also designates an astable multivibrator composed of inverters 406 and 407 to generate pulse signals having a pulse width of about 5 msec and a suitable time interval. Numeral 408 designates a gating circuit composed of an inverter 409, a NAND gate 410 and a transistor 411 and adapted to pass, for a period of about 5 msec which is dependent on the output of the astable multivibrator 405, the pseudo signals of about 3 KHz from the astable multivibrator 402 to the transistor 120 of the current regulator circuit 106, thereby modulating the microwave of the microwave oscillator 101 with the pseudo signals. Numeral 412 designates an inverter, 413 a NAND gate. The two elements receive intermittent signals from the astable multivibrator 405 which indicate a check period and produce, upon termination of this check period, a pulse of a predetermined time width which is applied to a clear terminal CL of a D flip-flop 414. Numeral 415 designates a NAND gate which performs the NAND operation on the outputs of the operational amplifiers 112 and 118 in the operation circuit 100, so that a "0" signal is produced at the output of the NAND gate 415 when the operation circuit 100 is in a normal condition, whereas a "1" is generated at the output of the NAND gate 415 when the operation circuit 100 is in a faulty condition. The output signal of the NAND gate 415 is applied to a D terminal of the D flip-flop 414. Numeral 416 designates a NAND gate which, along with the inverter 401, produce a signal for preventing the filament 200 from being heated during each check period and a predetermined period of time after the termination of the check period, thereby preventing the misoperation of the apparatus due to the effectuation of the check.

The second check circuit 500 consists of a transistor 501 which detects whether or not the filament 200 has been burnt out.

The third check circuit 600 consists of a switch 601 adapted to open when the pressure in the compressed air bomb constituting a compressed air source for the air bag drops below a predetermined value and a resistor 602.

The logical circuit 700 comprises an inverter 701 and a NAND gate 702, whereby the NAND gate 702 receives the signal produced at a Q terminal of the D flip-flop 414 in the first check circuit 400 and inverted by the inverter 701, the output produced at the collector of the transistor 501 in the second check circuit 500, the signal produced at a junction point 603 of the switch 601 and the resistor 602 in the third check circuit 600, and the output of the blown fuse detecting circuit 1100, so that all the signals indicative of whether or not there is any fault in the apparatus are gathered and a "1" signal is produced at the output of the NAND gate 702 when there is any fault in the apparatus.

The time circuit 800 comprises a resistor 801, a capacitor 802 and a diode 803.

The storage means driving circuit 900 comprises a transistor 901, an inverter 902, a resistor 903 and an SCR 904, and the fuse 1000 is connected in series with the SCR 904. The blown fuse detecting circuit 1100 comprises a resistor 1101. The alarm actuating circuit 1200 comprises an astable multivibrator 1201 and a transistor 1202, and the lamp 1300 is connected to the collector of the transistor 1202.

The voltage detecting circuit 1500 consists of voltage dividing resistors 1501 and 1502, transistors 1503 and 1504 and a Zener diode 1505. The monostable circuit 1600 comprises a NAND gate 1601 and an inverter 1602.

Each of the inverters 115, 116, 401, 403, 404, 406, 407, 409, 412, 701, 902 and 1602, the NAND gates 119, 410, 413, 415, 416, 702 and 1601, the NOR gate 301 and the D flip-flop 414 consists of a complementary symmetry MOS integrated circuit.

With the arrangement shown in FIG. 2, the operation of the system according to the present invention will now be explained. In the first place, the fundamental operation of the air bag apparatus for inflating the air bag when there is the danger of the automobile colliding with a target will be explained. The microwave energy generated by the microwave oscillator 101 is transmitted to the transmitting antenna 104 which radiates the microwave energy toward the front of the automobile. The reflected wave of the radiated microwave power intercepted by and reflected from the target is received by the receiving antenna 105 and applied to the microwave detecting diode 103 through the directional coupler 102. On the other hand, a portion of the microwave power from the microwave oscillator 101 is combined with the reflected wave through the directional coupler 102 and the applied to the microwave detecting diode 103. The reflected wave is subjected to the process of homodyne detection in the microwave detecting diode 103 so that the diode 103 produces at its output a doppler signal having a frequency corresponding to the relative velocity of the automobile and the target, the doppler signal further having a level corresponding to the distance between the automobile and the target and the size, material or the like of the target. Then, the doppler signal is amplified in the low frequency amplifier 108 and is rectified in the rectifier circuit 111. The voltage of the rectified doppler signal is compared with a fixed value determined by the Zener diode 113 in the operational amplifier 112, so that when the former is greater than the latter, the operational amplifier 112 produces a "1" signal. On the other hand, the rectangular waveform obtained through the reshaping of the output of the low frequency amplifier 108 in the Schmitt circuit 114 is subjected to the process of D-A conversion in the D-A converter 117. The voltage produced by this D-A conversion is then compared with a fixed value determined by the Zener diode 121 in the operational amplifier 118, whereby when the former is greater than the latter, the operational amplifier 118 produces a "1" signal. If both of the operational amplifiers 112 and 118 produce a "1" signal at the respective outputs thereof, it means that there is the very great danger of the automobile colliding with the target and therefore the air bag must be inflated. In this case, if the output of the inverter 401 in the first check circuit 400 is a "1" signal, then all the inputs to the NAND gate 119 consist of "1" signals and the NAND gate 119 produces a "0" signal at the output. The inverter 401 produces a "0" signal while the first check circuit 400 is performing a check and produces a "1" signal when no check is being performed. The "0" signal produced at the output of the NAND gate 119 is applied to one input of the NOR gate 301 of the detonator actuating circuit 300 and the output of the logical circuit 700 is applied to the other input of the NOR gate 301. In this case, since a "0" signal appears at the output of the logical circuit 700 when there is no fault in any portions of the apparatus, the NOR gate 301 has a "1" signal at its output. This "1" signal turns the SCR 302 on so that the detonator filament 200 is energized and heated, igniting and setting off the explosive. Consequently, the valve is opened and the compressed air in the compressed air bomb is introduced through the valve into the air bag rapidly, thus inflating the air bag at the breast of the occupants.

Next, the checking operation at various points of the apparatus will be explained. The checking operation of the first check circuit 400 for finding whether or not the operation of the operation circuit 100 is normal with the use of pseudo signal will be explained first. The pseudo signal of about 3 KHz generated by the astable multivibrator 402 in the first check circuit 400 is controlled by the gating pulses generated by another astable multivibrator 405, whereby the pseudo signal of about 3 KHz is applied by the gating circuit 408 for a period of about 5 msec at suitable time intervals to the microwave oscillator 101 through the transistor 120 of the current regulator circuit 106, thereby modulating the microwave with the pseudo signal. The modulated microwave is applied to the microwave detecting diode 103 through the directional coupler 102. If the current regulator circuit 106, the microwave oscillator 101, the directional coupler 102 and the microwave detecting diode 103 are functioning normally, the pseudo signal is detected at the output of the diode 103.

The level and oscillation frequency of the pseudo signal are preselected respectively to become higher than a fixed level determined by the Zener diode 113 in the operation circuit 100 and a fixed frequency determined by the Zener diode 121. Consequently, the detected pseudo signal is processed by the operation circuit 100 in a manner similar to the previously described processing of the doppler signal. Thus, if the low frequency amplifier 108 and the succeeding circuits in the operation circuit 100 are all in normal condition, both of the operational amplifiers 112 and 118 have a "1" signal at the respective outputs thereof and the NAND gate 415 in the first check circuit 400 produces a "0" signal at its output. In this case, since the inverter 401 produces a "0" signal during the checking operation and a predetermined time after the termination of the checking period, even when the "1" signals produced by this check at the output of the operational amplifiers 112 and 118, the NAND gate 119 has a "1" signal at its output and hence a signal for inflating the air bag is not produced. Now, with the "0" signal produced at the output of the NAND gate 415, i.e., when the operation circuit 100 is functioning normally, the NAND gate 413 applies a pulse to a clear terminal CL of the D flip-flop 414 and a "0" signal appears at Q terminal upon completion of each check. On the other hand, if there is any fault at the checked portions in the operation circuit 100, a "1" signal is produced at the output of thw NAND gate 415 and the D flip-flop 414 has a "1" signal at its Q terminal. To initiate the operation of the air bag apparatus, it is necessary to effect the initial resetting so that the D flip-flop 414 has a "0" signal at the Q terminal.

The burn-out check of the detonator filament 200 by the second check circuit 500 is carried out in the following manner: With the SCR 302 being turned off, if the filament 200 is functioning normally, the transistor 501 is turned off producing a "1" signal at its collector, whereas a "0" signal is produced at the collector of the transistor 501 if the filament 200 has been burnt out.

The third check circuit 600 checks whether or not the compressed air pressure in the compressed air bomb is maintained at a value higher than a predetermined value necessary to inflate the air bag, in the following manner: When the pressure in the bomb is higher than the predetermined value, the switch 601 is closed producing a "1" signal at the junction point 603, whereas if the pressure is below the predetermined value thus failing to meet the requirement, the switch 602 is opened producing a "0" signal at the junction point 603.

If the results of the above checking of the operation circuit 100, the filament 200 and the pressure in the compressed air bomb show the existence of a faulty condition in any of the checked portions, a "1" signal is generated at the output of the NAND gate 702 of the logical circuit 700, whereby this "1" signal immediately causes the NOR gate 301 of the detonator actuating circuit 300 to produce a "0" signal at its output, thereby preventing the igniting of the explosive by the filament 200, i.e., the operation of the air bag apparatus actuating means. On the other hand, the "1" signal produced at the output of the NAND gate 702 causes the astable multivibrator 1201 in the alarm actuating circuit 1200 to produce oscillations at a period of about 1 second, so that the lamp 1300 is turned on and off intermittently and thus warns the driver of the occurrence of a fault. The output of the NAND gate 702 is also applied to the timer circuit 800, so that at the expiration of a predetermined time of 30 seconds, for example, which is determined by the resistor 801 and the capacitor 802, the storage means driving circuit 900 is energized. In this way, when the fault lasts in excess of 30 seconds, the SCR 904 is turned on and thus fuse 1000 melts and continues to remember the occurrence of a fault. With the fuse 1000 now blown out, a "0" signal is generated at the power supply side end of the resistor 1101 of the blown fuse detecting circuit 1100. This "0" signal constitutes an input to the NAND gate 702, so that even though the fault has been temporarily mended after the blowing out of the fuse 1100, the "1" signal is still maintained at the output of the NAND gate 702 and thus the lamp 1300 is continuously turned on and off and the filament 200 is continuously prevented from being heated. By mending the faulty portion and replacing the blown fuse 1000, the apparatus may be returned to the original normal condition.

Further, when the key switch 1400 is closed to start the automobile, if the power supply voltage is higher than 8 volts for example, this voltage is detected by the voltage detecting circuit 1500 which in turn actuates the monostable circuit 1600 to produce a "0" signal for a predetermined length of time, e.g., 20 seconds. This "0" signal is applied to the alarm actuating circuit 1200, turning the lamp 1300 on for the duration of this "0" signal. Therefore, by confirming the lighting of the lamp 1300 within the predetermined time after the closing of the key switch 1400, the driver may check that the almp 1300 has not been burnt out.

In the embodiment so far described, the timer circuit 800 is provided to ensure that only when a fault lasts longer than a predetermined time, it is considered as a true fault, thereby preventing the system from being caused by external noise to momentarily judge as though there were a fault and operate erroneously. Therefore, this timer circuit 800 may be eliminated, if there is no possibility of the misoperation by noise.

While the invention has been illustrated and described by way of its specific embodiment, it is not intended to be limited to the details shown, since various modifications and changes may be made without departing in any way from the spirit of the present invention. For instance, the apparatus actuating means may consist of a solenoid or the like instead of the detonator. Further, the present invention may be embodied in other occupants protective apparatus than the air bag apparatus, such as, a seat belt apparatus or rear-end collision preventing apparatus. Furthermore, the storage means may consist of a magnetic memory capable of retaining its stored content even after the occurrence of a collision, a memory adapted to store information by virture of the melting of a low resistance resistor, or the like.

We claim:

1. In a vehicle occupants protective apparatus having an operation circuit for radiating an electromagnetic wave, receiving the electromagnetic wave reflected from a target body and combining said radiated wave and said reflected wave to generate a detection signal indicative of a vehicle collision, and an actuating circuit, connected to said operation circuit, for actuating an occupants protector means in response to said detection signal, a fault detecting system comprising:
    a first check circuit, connected to said operation circuit, for applying a pseudo signal of fixed frequency thereto to thereby continuously check an occurrence of a fault of said operation circuit;
    a second check circuit for checking an occurrence of a fault of at least one function of said vehicle occupants protective apparatus;
    a logical circuit, connected to said first and second check circuits, for generating an indication signal while at least one of the fault occurrences are being detected by said first and second check circuits;
    an indicator means, connected to said logical circuit, for indicating an occurrence of a fault in response to said indication signal;
    a timer circuit, connected to said logical circuit, for generating a timer signal representing that duration of said indication signal has exceeded a predetermined time;
    a storage means, connected to said timer circuit, for memorizing the generation of said timer signal irrespectively of expiration of said timer signal; and
    a prohibition circuit, connected between said storage means and said actuating circuit, for preventing the operation of said actuating circuit while said storage means memorizes the generation of said timer signal, whereby said occupants protector means is maintained irresponsive to said detection signal while at least one fault exists.

2. A fault detecting system for vehicle occupants protective apparatus comprising:
    a detecting means for generating a detection signal indicative of a collision of a vehicle;
    an actuating means, connected to said detecting means, for actuating a vehicle occupants protective apparatus in response to said detection signals;
    a first checking means, connected to said detecting means, for continuously checking an occurrence of a fault of said detecting means;
    a second checking means, connected to said vehicle occupants protective apparatus, for continuously checking an occurrence of a fault of said protective apparatus;
    an indicating means, connected to said first and second checking means, for indicating at least one of the faults of said detecting means and said protective apparatus;
    a timer means, connected to said first and second checking means, for generating a timer signal representing that duration of the occurrence of at least one of the faults is longer than a predetermined time;
    a storage means, connected between said timer means and said actuating means, for continuously prohibiting the operation of said actuating means in response to said timer signal, whereby actuation of said protective apparatus is prevented while at least one of the faults exists; and
    wherein said detecting means includes an operation circuit for radiating an electromagnetic wave, receiving the electromagnetic wave reflected from a target body and combining said radiated wave and said reflected wave to generate said detection signal, and wherein said first checking means includes a pseudo signal generator for continuously applying a pseudo signal of fixed frequency to said operation circuit to thereby check the operation thereof.

3. A fault detecting system according to claim 2 wherein said operation circuit includes a microwave oscillator using an IMPATT diode.

4. A fault detecting system according to claim 2, wherein said actuating means includes a filament serving as a detonator for inflating a gas bag in said vehicle occupants protective apparatus with compressed gas from a compressed gas vessel, and wherein said second checking means includes a transistor which changes its conductivity in response to burnt-out of said filament.

5. A fault detecting system according to claim 4, wherein said second checking means further includes a switch adapted to switch over when pressure in said compressed gas vessel drops below a predetermined value.

6. A fault detecting system according to claim 2, wherein said indicating means includes an indicator lamp and an astable multivibrator, connected to said lamp, for flickering illumination of said lamp.

7. A fault detecting system according to claim 2, wherein said timer means includes an integration circuit having a resistor and a capacitor.

8. A fault detecting system according to claim 2, wherein said storage means includes a fuse for memorizing the generation of the timer signal.

9. A fault detecting system according to claim 5, further comprising a logical circuit including a NAND gate whose input terminals are connected to said transistor and said switch of said second checking means and whose output terminal is connected to said actuating means, said indicating means and said timer means.

* * * * *